US012613384B2

(12) United States Patent　(10) Patent No.:　US 12,613,384 B2
Cho et al.　(45) Date of Patent:　Apr. 28, 2026

(54) OPTICAL TRANSCEIVER HAVING TILTED OPTICAL FIBERS

(71) Applicant: OPTOMIND INC., Suwon-Si (KR)

(72) Inventors: Hyunryong Cho, Suwon-si (KR);
Yung-sung Son, Suwon-si (KR)

(73) Assignee: OPTOMIND INC., Suwon-Si (KR)

( * ) Notice: Subject to any disclaimer, the term of this
patent is extended or adjusted under 35
U.S.C. 154(b) by 316 days.

(21) Appl. No.: 18/076,582

(22) Filed: Dec. 7, 2022

(65) Prior Publication Data

US 2023/0408776 A1　Dec. 21, 2023

(30) Foreign Application Priority Data

Jun. 15, 2022　(KR) ........................ 10-2022-0072968

(51) Int. Cl.
G02B 6/42　(2006.01)
(52) U.S. Cl.
CPC ........... G02B 6/4214 (2013.01); G02B 6/423
(2013.01)
(58) Field of Classification Search
None
See application file for complete search history.

(56) References Cited

U.S. PATENT DOCUMENTS

| | | | | | |
|---|---|---|---|---|---|
| 6,075,913 | A | * | 6/2000 | Cohen | G02B 6/426 |
| | | | | | 385/47 |
| 6,342,871 | B1 | * | 1/2002 | Takeyama | G02B 27/0172 |
| | | | | | 359/630 |

| | | | | | |
|---|---|---|---|---|---|
| 6,668,113 | B2 | * | 12/2003 | Togami | G02B 6/4246 |
| | | | | | 385/35 |
| 6,957,006 | B2 | * | 10/2005 | Terakawa | G02B 6/4201 |
| | | | | | 385/39 |
| 7,016,559 | B2 | * | 3/2006 | Kano | G02B 6/4206 |
| | | | | | 385/33 |
| 7,071,457 | B2 | * | 7/2006 | Farr | G01J 3/02 |
| | | | | | 250/226 |
| 7,228,032 | B2 | * | 6/2007 | Blauvelt | G02B 6/3636 |
| | | | | | 385/31 |
| 7,254,296 | B2 | * | 8/2007 | Lam | G02B 6/4206 |
| | | | | | 385/33 |
| 7,802,930 | B2 | * | 9/2010 | Jewell | G02B 6/327 |
| | | | | | 385/33 |
| 7,995,881 | B2 | * | 8/2011 | Hodono | G02B 6/43 |
| | | | | | 385/14 |
| 8,277,132 | B2 | * | 10/2012 | Lee | G02B 6/4246 |
| | | | | | 385/88 |
| 8,818,145 | B2 | * | 8/2014 | Bowen | G02B 6/4214 |
| | | | | | 385/14 |

(Continued)

FOREIGN PATENT DOCUMENTS

| | | | |
|---|---|---|---|
| JP | 2003307603 | A | 10/2003 |
| JP | 2004508581 | A | 3/2004 |

(Continued)

*Primary Examiner* — Andrew Jordan
(74) *Attorney, Agent, or Firm* — Harness, Dickey &
Pierce, P.L.C.

(57)　ABSTRACT

Embodiments of the present disclosure relate to an optical
transceiver, and more particularly to an optical transceiver
that includes an optical system capable of simultaneously
performing both functions of a reflector and a focusing lens,
does not cause Fresnel reflection through an integrated
optical system made of the same medium, and furthermore
facilitates optical alignment.

10 Claims, 8 Drawing Sheets

(56) References Cited

U.S. PATENT DOCUMENTS

| | | | | |
|---|---|---|---|---|
| 8,985,868 | B2 * | 3/2015 | Giziewicz | G02B 6/4246 |
| | | | | 385/88 |
| 9,052,478 | B2 * | 6/2015 | Charbonneau-Lefort | |
| | | | | G02B 6/32 |
| 9,188,772 | B2 * | 11/2015 | Aburmad | G02B 23/04 |
| 9,557,488 | B2 * | 1/2017 | DeMeritt | G02B 6/327 |
| 9,804,334 | B2 * | 10/2017 | Israel | G02B 6/30 |
| 10,191,232 | B2 * | 1/2019 | Hwang | G02B 6/4215 |
| 10,416,398 | B2 * | 9/2019 | Son | G02B 6/423 |
| 10,568,520 | B2 * | 2/2020 | Patel | G02B 17/06 |
| 10,761,278 | B2 * | 9/2020 | Jiang | G02B 6/4244 |
| 10,976,507 | B2 * | 4/2021 | Kim | G02B 6/34 |
| 11,336,374 | B1 * | 5/2022 | Gridish | G02B 6/4246 |
| 11,644,673 | B2 * | 5/2023 | Shih | G02B 27/0081 |
| | | | | 359/630 |
| 11,867,902 | B2 * | 1/2024 | Asai | B60R 1/001 |
| 12,001,068 | B2 * | 6/2024 | Son | G02B 6/4246 |
| 2002/0064191 | A1 * | 5/2002 | Capewell | G02B 6/4246 |
| | | | | 372/14 |
| 2002/0114566 | A1 * | 8/2002 | Fairchild | G02B 6/4208 |
| | | | | 385/33 |
| 2003/0156327 | A1 * | 8/2003 | Terakawa | G02B 6/4206 |
| | | | | 359/592 |
| 2004/0175072 | A1 * | 9/2004 | Lam | G02B 6/3572 |
| | | | | 385/39 |
| 2005/0025437 | A1 * | 2/2005 | Kano | G02B 6/4246 |
| | | | | 385/39 |
| 2005/0152643 | A1 * | 7/2005 | Blauvelt | G02B 6/4206 |
| | | | | 385/31 |
| 2006/0280404 | A1 * | 12/2006 | Kennedy | G02B 6/3624 |
| | | | | 385/39 |
| 2009/0154934 | A1 * | 6/2009 | Jiang | G02B 6/4246 |
| | | | | 398/135 |

| | | | | |
|---|---|---|---|---|
| 2011/0052125 | A1 * | 3/2011 | Lee | G02B 6/4271 |
| | | | | 385/88 |
| 2013/0034325 | A1 * | 2/2013 | Bowen | G02B 6/4214 |
| | | | | 385/14 |
| 2013/0259419 | A1 * | 10/2013 | Charbonneau-Lefort | |
| | | | | G02B 6/32 |
| | | | | 385/14 |
| 2014/0050490 | A1 * | 2/2014 | Giziewicz | H04B 10/40 |
| | | | | 398/139 |
| 2015/0241647 | A1 * | 8/2015 | Giziewicz | G02B 6/4246 |
| | | | | 385/33 |
| 2016/0238794 | A1 * | 8/2016 | Tang | G02B 6/4214 |
| 2017/0371112 | A1 * | 12/2017 | Hwang | G02B 6/4208 |
| 2018/0003908 | A1 * | 1/2018 | Jung | G02B 6/34 |
| 2018/0192880 | A1 * | 7/2018 | Patel | G02B 27/0911 |
| 2018/0259773 | A1 * | 9/2018 | Asai | G02B 6/0038 |
| 2018/0306985 | A1 * | 10/2018 | Son | G02B 6/4214 |
| 2019/0285816 | A1 * | 9/2019 | Jiang | G02B 6/4244 |
| 2020/0363597 | A1 * | 11/2020 | He | G02B 6/4239 |
| 2020/0379193 | A1 * | 12/2020 | Kim | G02B 6/322 |
| 2021/0364795 | A1 * | 11/2021 | Asai | B60K 35/00 |
| 2022/0019036 | A1 * | 1/2022 | Son | H04B 10/40 |
| 2022/0113479 | A1 * | 4/2022 | Lin | G02B 6/4206 |
| 2023/0408776 | A1 * | 12/2023 | Cho | G02B 6/423 |
| 2024/0280770 | A1 * | 8/2024 | Son | H04B 10/40 |

FOREIGN PATENT DOCUMENTS

| | | | |
|---|---|---|---|
| JP | 2006023777 A | | 1/2006 |
| JP | 2013131637 A | | 7/2013 |
| JP | 5818673 B2 | | 11/2015 |
| KR | 101689398 B1 | | 12/2016 |
| KR | 20180061170 A | | 6/2018 |
| KR | 20190084910 A | * | 7/2019 |
| KR | 102353432 B1 | | 1/2022 |
| WO | 0221171 A2 | | 3/2002 |
| WO | 2017062075 A1 | | 4/2017 |

* cited by examiner air or
index-mismatch material

OPTICAL TRANSCEIVER HAVING TILTED OPTICAL FIBERS

CROSS-REFERENCE TO RELATED APPLICATION

This application claims the benefit and priority of Korean Patent Application No. 10-2022-0072968 filed Jun. 15, 2022. The entire disclosure of the above application is incorporated herein by reference.

BACKGROUND OF THE INVENTION

Technical Field

Embodiments of the present disclosure relate to an optical transceiver, and more particularly to an optical transceiver that includes an optical system capable of simultaneously performing both functions of a reflector and a focusing lens, does not cause Fresnel reflection through an integrated optical system made of the same medium, and furthermore facilitates optical alignment.

Background

Optical communication technology has been mainly adopted for long-range data transmission. Because of its advantage of being able to transmit the large-capacity data at high speed, it has been also used for short-range data transmission between servers or between a rack-to-rack, board-and-board and chip-on-chip in a single server. Further, in recent years, optical communication technology has been actively considered to use for communications between boards inside smart devices.

For example, short-range optical communications between servers are being utilized in data centers, cloud computing, high-performance computing (HPC), ultra-high definition (UHD), three-dimensional visualization techniques, etc.

As the bandwidth required for device-to-device communications increases, optical communication technology has also been introduced into InfiniB and, DVI (digital visual interface), HDMI (high definition multimedia interface), DP (DisplayPort), USB 3.0, and the like, which are device-to-device digital interface standards. Small multi-channel optical modules can be used in the device-to-device digital interface standards, and the studies on them have been actively conducted.

Existing optical components and systems for long-range data transmission can also be adopted for short-range optical communications, but are not cost-effective because they are designed for different usage. The components and systems for the short-range optical communications are required to be suitable for large-capacity data transmission in short-range and also cost-effective. For example, optical transceiver modules using vertical-cavity surface-emitting lasers (VCSELs) and vertical-type photodiodes have been used as components suitable for short-range optical communications.

A VCSEL emits a laser beam in a direction perpendicular to the substrate, and a vertical-type photodiode also has to be incident with light in the direction perpendicular the substrate. Since optical fibers are typically arranged in a direction parallel to the substrate, the optical path has to be changed vertically to adopt a VCSEL and a vertical-type photodiode. Mirrors or reflection prisms may be used to modify the optical path, and one or more lenses may be employed to increase optical coupling efficiency.

FIG. 1 is a schematic diagram of a conventional optical transceiver using a VCSEL or a vertical-type photodiode.

In a conventional optical transceiver, an optical transmitter 20 is composed of a transmitter collimator lens 21, a transmitter reflection prism 22, and a transmitter focusing lens 23, and an optical receiver 30 includes a receiver collimator lens 31, a receiver reflective prism 32 and a receiver focusing lens 33.

Light emitted from a light source L in a direction perpendicular to the substrate is incident on the transmitter collimator lens 21, and the transmitter collimator lens 21 converts the incident light into light traveling in parallel one another. The transmitter reflection prism 22 reflects the light from the transmitter collimator lens 21 and changes its path by 90° in the direction towards the optical fiber 10. The reflected light is focused through the transmitter focusing lens 23 into the optical fiber 10.

The light, that is transmitted through the optical fiber 10 and emitted, is incident on the receiver collimator lens 31, which converts the incident light into light traveling in parallel one another. The receiver reflection prism 32 reflects the light from the receiver collimator lens 31, and changes its path by 90°. The reflected light travels in a direction perpendicular to the substrate via the receiver focusing lens 33 and is incident on the photodiode D. Thereby, the optical signal transmitted from the optical transmitter 20 is transmitted to the optical receiver 30 via the optical fiber 10.

However, in the conventional optical system shown in FIG. 1, the optical fiber 10 at the optical transmitter 20 needs to be aligned with a focal length at a position spaced apart from the transmitter focusing lens 23. Likewise, the optical fiber 10 at the optical receiver 30 is required to be aligned with an optical path length at a position spaced apart from the receiver collimator lens 31. These optical alignments require a sophisticated alignment mechanism.

In addition, since the optical fiber 10 is exposed to the air in the conventional optical system of FIG. 1, contamination with dust or foreign substances may occur in the core of the optical fiber 10, additional optical coupling loss due to Fresnel loss may occur, and the efficiency of optical coupling may vary depending on the cross sectional cut of the optical fiber 10. Thus, the optical system of FIG. 1 has a problem that all optical alignments between each optical component must be precisely made within a defined level of error.

FIG. 2 shows a schematic diagram of an optical transceiver according to a prior art.

The optical system of FIG. 2 is to solve the problem of the optical system according to FIG. 1. The transmitter focusing lens 23 is spaced apart from the reflective prism 22, and the transmitter spacer 24, which has a thickness corresponding to the focal length of the transmitter focusing lens 23, is combined with the transmitter focusing lens 23. Therefore, the optical alignment on the transmission side can be easily performed by coupling the optical fiber 10 to the side of the transmitter spacer 24.

In addition, the receiver collimator lens 31 is spaced apart from the receiver reflection prism 32, and the receiver spacer 34, which has a thickness corresponding to the optical path length of the receiver collimator lens 31, is combined with the receiver collimator lens 31. Therefore, the optical alignment on the receiving side can be easily performed by coupling the optical fiber 10 to the side of the receiver spacer 34 (KR Patent No. 10-2353432 filed on Jun. 24, 2019 by the same applicant, which is incorporated herein by reference).

The optical system of FIG. 2 is to solve the problem caused by the optical fiber 10 exposed to the air in the optical system in FIG. 1 or the problem of sophisticated optical alignments with the transmitter focusing lens 23 and/or the receiver collimator lens 31. However, the optical system of FIG. 2 has another problem that the number of optical components is increased compared with the optical system in FIG. 1, which makes optical alignments between them difficult. That is, in the optical system of FIG. 2, the reflection prism 22, the transmitter focusing lens 23, the transmitter focusing lens 31 and the reflection prism 32 are separate parts, and optical alignments between them are further required.

In addition, the reflection prism 22 and the transmitter focusing lens 23, as well as the transmitter focusing lens 31 and the reflection prism 32 are spaced apart from each other so that air or a medium with a different refractive index exists between them. This may cause an index mismatch and consequently optical loss due to Fresnel reflection at the interface.

These problems may degrade the reliability of the optical transceiver and may require additional equipment and/or time for optical alignments.

Accordingly, a structure for an optical transceiver is necessary, which enables easy optical alignment, requires a small number of optical components, and prevents Fresnel reflection due to a medium having a different refractive index.

Technical Problem

Embodiments of the present disclosure are to solve the problems in the prior art as described above, and provide an optical transceiver for easy optical alignment, with a small number of optical components, and preventing Fresnel reflection due to a medium having a different refraction index.

Embodiments of the present disclosure are to provide an optical transmitter including an integrated optical system made of the same medium with a simple structure, capable of simultaneously performing both functions of a reflection prism and a focusing lens.

Embodiments of the present disclosure are to provide an optical transceiver that prevent Fresnel reflections by adopting an integrated optical system made of the same medium, and that can easily perform optical alignment.

SUMMARY

An optical transmitter according to an embodiment of the present disclosure for solving the above-mentioned technical problem includes a transmitter body, the transmitter body comprises a transmitter convex lens formed in a downwardly convex shape on the lower surface of the transmitter body, facing the light source and collimating the incident light emitted from the light source; and a transmitter reflective curved surface formed as a reflective curved surface on one surface of the transmitter body, reflecting the parallel rays collimated by the transmitter convex lens to focus the light beam reflected from the curved reflective surface into the optical fiber, wherein the transmitter convex lens and the transmitter reflection curved surface are integrally formed in the transmitter body using a material having the same refractive index.

According to an embodiment of the present disclosure, the reflective curved surface for the transmitter reflective curved surface is formed within an angle range of 47.5° to 50° with respect to the bottom horizontal plane of the transmitter body.

According to an embodiment of the present disclosure, a transmitter vertical surface of the transmitter body is separated from the transmitter reflective curved surface by its focal length.

According to an embodiment of the present disclosure, the optical alignment is achieved by attaching the cross section of the optical fiber to the transmitter vertical surface.

According to an embodiment of the present disclosure, the optical fiber is arranged to be inclined with a tilting angle with respect to the vertical direction of the transmitter vertical surface.

According to an embodiment of the present disclosure, the tilting angle is in the range of 5° or more and 10° or less.

According to an embodiment of the present disclosure, the optical transmitter further comprises an optical fiber guide capable of guiding the optical fiber to a position for optical alignment.

An optical receiver according to an embodiment of the present disclosure for solving the above-mentioned technical problem includes a receiver body, the receiver body comprises a receiver reflective curved surface formed as a curved reflective surface on one surface of the receiver body, reflecting the light emitted from the optical fiber to collimate the incident light into parallel rays; and a receiver convex lens formed in a downwardly convex shape on the lower surface of the receiver body, facing the photodiode and focusing the parallel rays reflected from the receiver reflective curved surface to the photodiode, wherein the receiver reflective curved surface and the receiver convex lens are integrally formed in the receiver body using a material having the same refractive index.

According to an embodiment of the present disclosure, the curved reflected surface for the receiver reflective curved surface is formed within an angle range of 47.5° to 50° with respect to the horizontal bottom surface of the receiver body.

According to an embodiment of the present disclosure, a receiver vertical surface of the receiver body is separated from the receiver reflective curved surface by its focal length.

According to an embodiment of the present disclosure, the optical alignment is achieved by attaching the cross section of the optical fiber to the receiver vertical surface.

According to an embodiment of the present disclosure, the optical fiber is arranged to be inclined with a tilting angle with respect to the vertical direction of the receiver vertical surface.

According to an embodiment of the present disclosure, the tilting angle is in the range of 5° or more and 10° or less.

According to an embodiment of the present disclosure, the optical receiver further comprises an optical fiber guide capable of guiding the optical fiber to a position for optical alignment.

An assembly according to an embodiment of the present disclosure comprises an optical transmitter or receiver according to an embodiment of the present disclosure.

Effects

According to an embodiment of the present disclosure, optical alignment can be easily achieved by adopting an integrated optical system with a simple structure.

According to an embodiment of the present disclosure, Fresnel reflection can be prevented by using an integrated optical system made of the same medium.

According to an embodiment of the present disclosure, an integrated optical system for optical transmitters can be provided, with a simple structure that can simultaneously perform both functions of a reflection prism and a focusing lens.

According to an embodiment of the present disclosure, an integrated optical system for optical receivers can be provides, with a simple structure that can simultaneously perform both functions of a reflection prism and a collimator lens.

The specific effects of the present disclosure in addition to the above will be described while explaining the specific details of the disclosure below.

DETAILED DESCRIPTION

Figure 1:
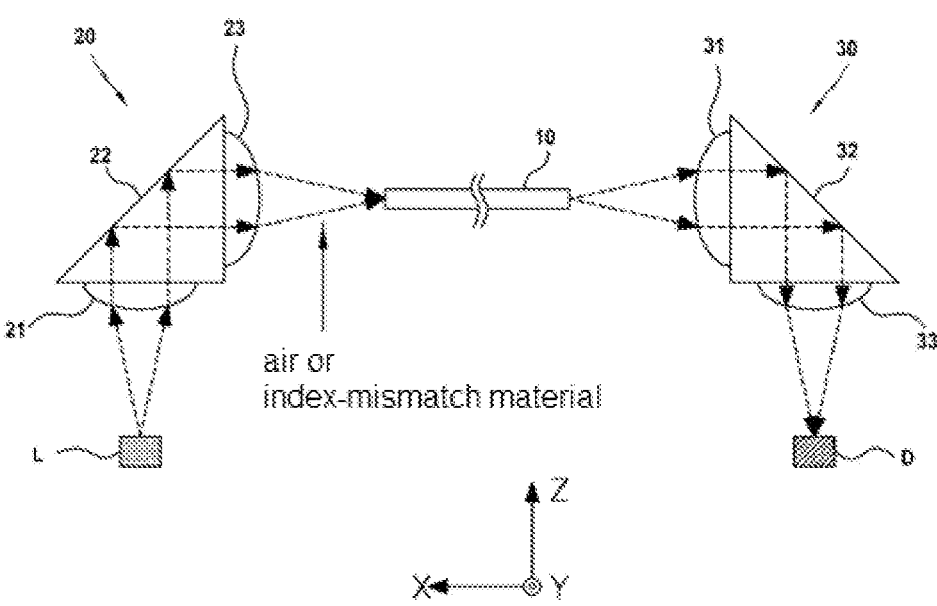
FIG. 1 is a schematic diagram of an optical system constituting an optical transceiver according to the prior art.

It should be noted that the embodiments of the present disclosure described below are merely examples to facilitate understanding of the present disclosure, and do not limit the present disclosure. In other words, the shapes, dimensions, arrangements, and the like of the elements described below can be changed and improved without departing from the spirit of the present disclosure, and it goes without saying that the present disclosure includes equivalents thereof.

In all the drawings, the same components are denoted by the same reference numerals, and redundant description is omitted as appropriate. In addition, in each drawing, since the dimensional ratio is adjusted so that the difference in characteristic configuration of each part becomes clear, it may be different from the actual dimensional ratio.

The components expressed in the singular or plural form herein may be construed to include both the singular and plural form except where necessary. Furthermore, the terms "first," "second," and the like are only used as terms for distinguishing one element from another, and the scope of the claims should not be limited by these terms.

Further, when it is stated that one component is "connected" with other component, it should be understood to include the case where it is directly connected as well as the case where it is connected through another component in the middle. Only when it is stated to be "directly connected" or "directly coupled", it should be understood that one component and other component are connected without another component in the middle. Similarly, other expressions describing a relationship between elements should be understood to be equivalent.

Embodiments of the present disclosure relate to an optical transceiver, and more particularly to an optical transceiver that includes an optical system capable of simultaneously performing both functions of a reflector and a focusing lens, does not cause Fresnel reflection through an integrated optical system made of the same medium, and furthermore facilitates optical alignment.

Hereinafter, the embodiments of the present disclosure will be described in more detail with reference to the accompanying drawings.

Figure 3:
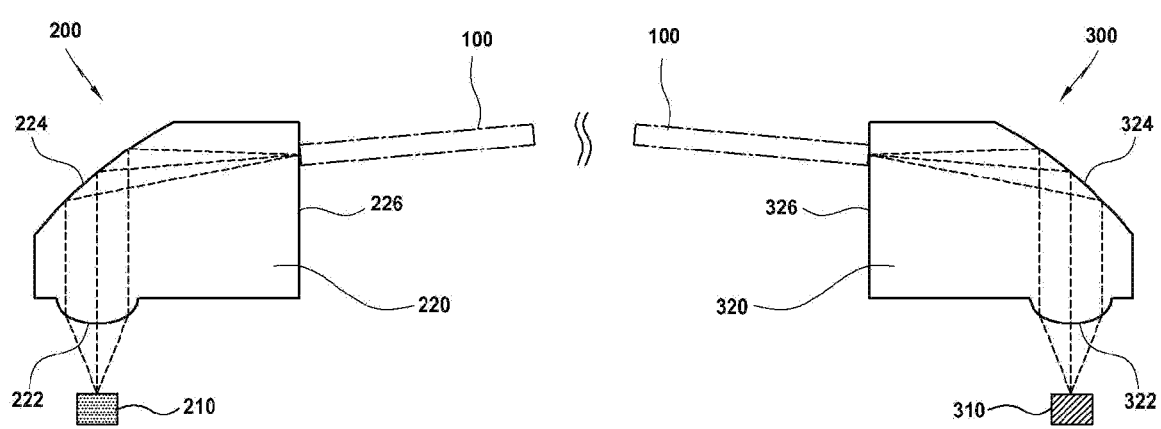
FIG. 3 is a schematic diagram of an optical system constituting an optical transceiver according to an embodiment of the present disclosure.

FIG. 3 is a schematic diagram of an optical transceiver according to an embodiment of the present disclosure.

An optical transceiver according to an embodiment of the present disclosure may have an optical transmitter 200 on one side and an optical receiver 300 on the other side around the optical fiber 100.

[Optical Transmitter]

Figure 4:
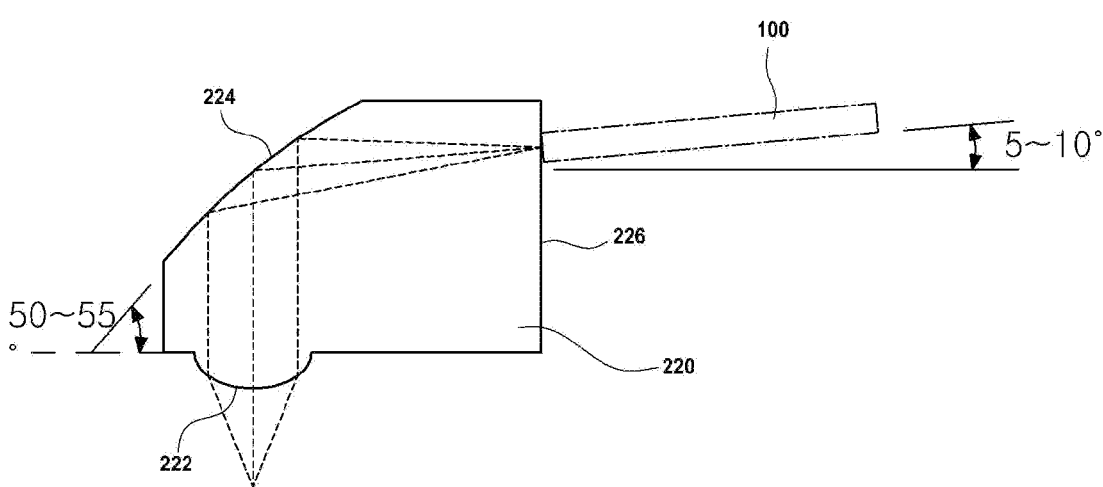
FIG. 4 is a schematic diagram illustrating the optical transmitter of FIG. 3 in detail.
Figure 5:
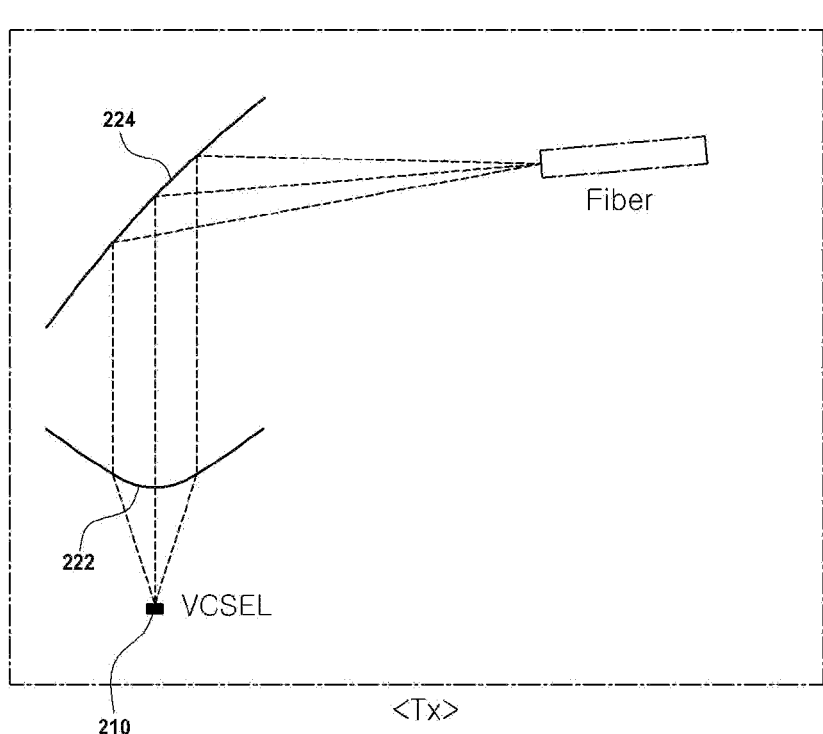
FIG. 5 is a schematic diagram illustrating the optical transmitter of FIG. 3 in detail.

FIGS. 4 and 5 are schematic diagrams illustrating the optical transmitter of FIG. 3 in detail.

Figure 2:
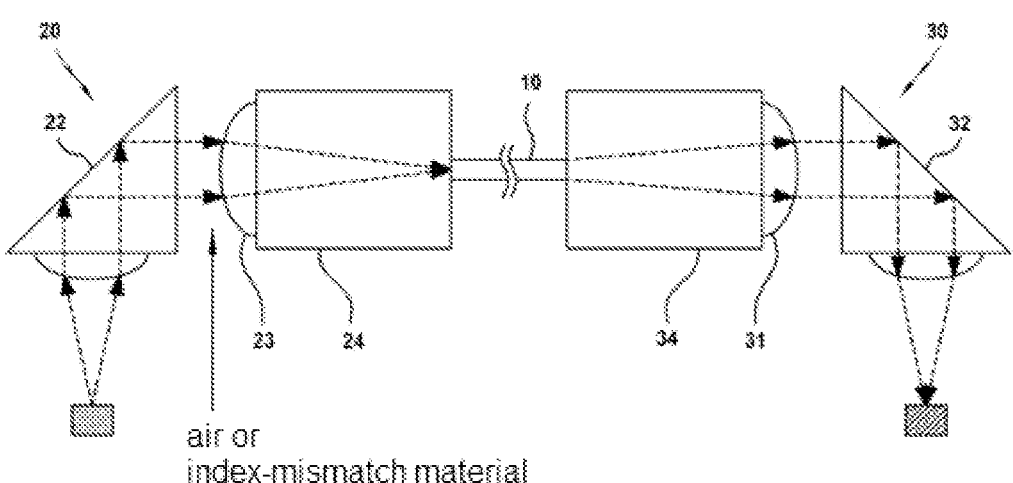
FIG. 2 is a schematic diagram of another optical system constituting an optical transceiver according to the prior art.
Figure 2:
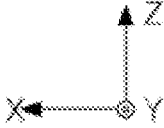

An optical transmitter 200 according to an embodiment of the disclosure may include a light source 210 and a transmitter body 220. Here, the transmitter body 220 is integrally configured to perform the reflection and light collecting functions. For example, the transmitter body 220 can be integrally implemented to perform all the functions of the transmitter collimator lens 21, transmitter reflection prism 22, transmitter focusing lens 23 and transmitter spacer 24 in an optical system according to the prior art shown in FIGS. 1 and 2.

According to an embodiment of the present disclosure, the light source 210 may use a VCSEL. VCSELs have the advantage of being suitable for large data transmission in short-range optical connections at relatively low cost.

Referring to FIGS. 3-5, a transmitter convex lens 222 with a downwardly convex shape is integrally formed on a lower surface of the transmitter body 200 that faces the light source 210. The transmitter convex lens 222 plays the same role as the transmitter collimator lens 21 in an optical system according to the prior art, and converts the incident light, emitted with a constant radiation angle from the light source 200, into light beams that travel in parallel one another. According to an embodiment of the present disclosure, the transmitter convex lens 222 may be configured to form an integral component by processing a portion of the transmitter body 220.

Referring to FIGS. 3 to 5, a transmitter reflection curved surface 224 is formed on the upper portion of the transmitter body 220 where the parallel light converted by the transmitter convex lens 222 arrives. The transmitter reflection curved surface 224 simultaneously performs both functions of reflection and light collection. Unlike the reflection prism 22 of the conventional optical system, the transmitter reflection curved surface 224 has a curved surface rather than a flat surface for reflection. The angle of total reflection at each point of the transmitter reflection curved surface 224 is adjusted to focus the light reflected from the curved surface 224 into the optical fiber 100. Therefore, the transmitter reflection curved surface 224 focuses the reflected light into the optical fiber while reflecting the parallel light incident on the curved surface. That is, the transmitter reflection curved surface 224 simultaneously performs both functions of the reflection prism 21 and the focusing lens 23 in the conventional optical system of FIGS. 1 and 2.

According to an embodiment of the present disclosure, the transmitter reflection curved surface 224 may be formed within an angle range of 47.5-50° with respect to the bottom horizontal plane of the transmitter body 220, as shown in FIG. 4.

According to an embodiment of the present disclosure, the focal plane of the transmitter reflective curved surface 224 may be formed on the transmitter vertical surface 226 that is one side of the transmitter body 220. Therefore, optical alignment on the transmission side can be easily performed by attaching the optical fiber 100 to the transmitter vertical surface 226. As a result, the space between the transmitter reflection curved surface 224 and the transmitter vertical surface 226 correspond to the transmitter spacer 24 in the conventional optical system of FIG. 2.

According to one embodiment of the present disclosure, the optical fiber 100 may be coupled vertically to the transmitter vertical surface 226. For example, the assembly 400 for an optical transmitter may include an optical fiber guide 418 formed such that the optical fiber 100 is vertically coupled to the transmitter vertical surface 226. According to another embodiment of the present disclosure, the optical fiber 100 may be disposed to be inclined at an angle (hereinafter referred to as a Tilt angle) with respect to the vertical direction of the transmitter vertical surface 226. For example, the optical fiber 100 may be disposed at a tilt angle of 5-10° with respect to the vertical direction of the transmitter vertical surface 226.

In order to focus the reflected light into the optical fiber 100 through the transmitter reflection curved surface 224, the total reflection condition for reflecting the parallel light into the optical fibers 110 should be satisfied at all portions of the transmitter reflection curved surface 224. Referring to FIG. 4, the angle formed by the parallel incident light and the light reflected from the transmitter reflection curved surface 224 into the optical fiber 100 becomes smaller toward the portion close to the optical fibers 100. As a result, the incident angle on the transmitter reflection curved surface 224 decreases so that the satisfaction of the total reflection condition becomes more difficult. In order to satisfy the total reflection condition for a smaller angle of incidence, the transmitter body 220 should be made up of materials with a high refractive index, which in turn means that manufacturing costs increase.

According to another embodiment of the present disclosure, when the optical fiber 100 is disposed to be inclined at an angle with respect to the vertical direction of the transmitter vertical surface 226 as shown in FIG. 4, the angle formed by the parallel incident light and the light reflected from the transmitter reflection curved surface 224 into the optical fibers 100 becomes larger. As a result, the incident angle on the transmitter reflection curved surface 224 increases so that the total reflection condition is easily satisfied. Therefore, it is possible to manufacture the transmitter body 220 satisfying the total reflection condition using an inexpensive material (dielectric) having a rather low refractive index, thereby reducing manufacturing cost.

For an optical transmitter according to an embodiment of the present disclosure, it was examined whether the incident angle according to the tilt angle of the optical fiber 100 satisfies the condition of the total reflection critical angle according to the refractive index of the material (e.g., dielectric) making up the transmitter body 220. This examination is conducted under the condition that the core diameter is about 50 $\mu$m, the numerical aperture (NA) is approximately 0.2, and the distance from the optical fiber 100 to the center of the transmitter reflection curved surface 224 is 700 $\mu$m. The results are shown in Table 1 below.

TABLE 1

| Fiber Tilt Angle | Refractive Index | NA Critical Angle | 0.2 Beam Angle MAX. | Fiber to Mirror Center Mirror Angle | 700 um Incident Angle |
|---|---|---|---|---|---|
| 0 | 1.5 | 41.81 | 7.66 | 39.98 | 32.32 |
| | 1.55 | 40.18 | 7.41 | 40.11 | 32.69 |
| | 1.6 | 38.68 | 7.18 | 40.23 | 33.05 |
| | 1.65 | 37.31 | 6.96 | 40.34 | 33.38 |
| | 1.7 | 36.03 | 6.76 | 40.44 | 33.69 |
| 3 | 1.5 | 41.81 | 7.66 | 41.47 | 36.81 |
| | 1.55 | 40.18 | 7.41 | 41.50 | 37.19 |
| | 1.6 | 38.68 | 7.18 | 41.72 | 37.54 |
| | 1.65 | 37.31 | 6.96 | 41.83 | 37.87 |
| | 1.7 | 36.03 | 6.76 | 41.94 | 38.18 |
| 6 | 1.5 | 41.81 | 7.66 | 42.96 | 41.30 |
| | 1.55 | 40.18 | 7.41 | 43.09 | 41.68 |
| | 1.6 | 38.68 | 7.18 | 43.22 | 42.03 |
| | 1.65 | 37.31 | 6.96 | 43.33 | 42.36 |
| | 1.7 | 36.03 | 6.76 | 43.43 | 42.68 |

According to Table 1, when the optical fiber 100 is tilted at a certain angle, preferably in the range of 5-10°, the total reflection condition can be sufficiently satisfied even with a dielectric having a relatively low refractive index.

According to an embodiment of the present disclosure, the light source 210 and the transmitter convex lens 222 may be arranged close to each other to satisfy the total reflection condition while using a low refractive index dielectric. As the distance between the light source 210 and the transmitter convex lens 222 decreases, the beam width decreases so that the total reflection condition can be easily satisfied on the transmitter reflection curved surface 224.

As noted above, the optical transmitter 200 according to the present disclosure includes the integrated transmitter body 220, which is made up of the same material. Therefore, the structure of the optical transmitter 200 can be simplified, optical loss due to Fresnel reflection can be prevented, and noise due to backpropagation of light can be blocked. Further, the number of optical components is small and the optical alignments between them can be easy.

[Optical Receiver]

Figure 6:
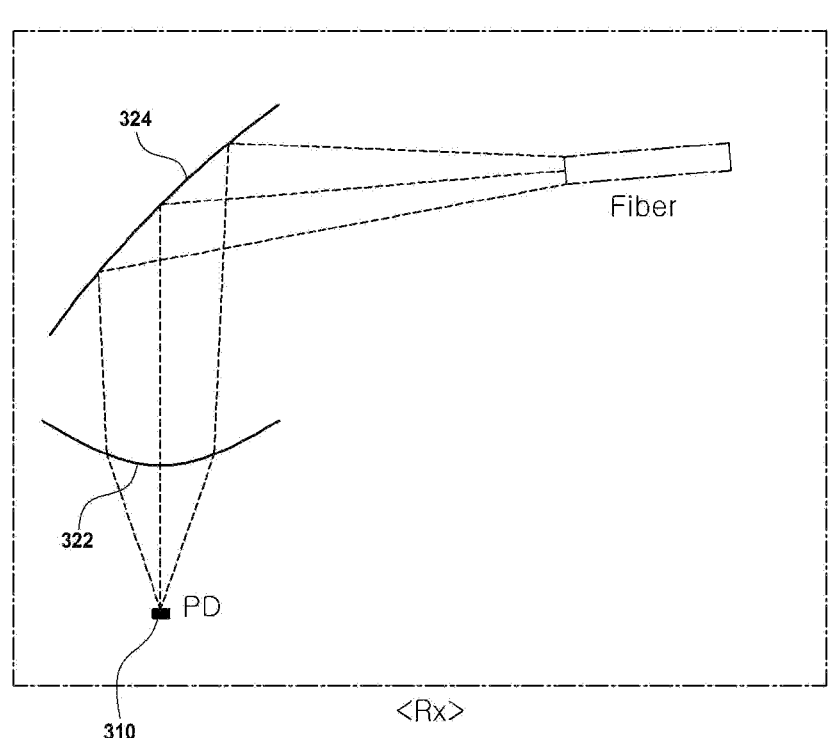
FIG. 6 is a schematic diagram illustrating the optical receiver of FIG. 3 in detail.

FIG. 6 is a schematic diagram illustrating the optical receiver of FIG. 3 in detail.

The optical receiver 300 according to an embodiment of the present disclosure may include a photodiode 310 and a receiver body 320. Here, the receiver body 320 is integrally configured to perform the reflection and light collecting functions. For example, the receiver body 320 can be integrally implemented to perform all the functions of the receiver collimator lens 31, receiver reflection prism 30, receiver focusing lens 33 and receiver spacer 34 in an optical system according to the prior art shown in FIGS. 1 and 2.

According to an embodiment of the present disclosure, the photodiode 310 may use a vertical-type photodiode. Vertical-type photodiodes have the advantage that they are suitable for large data transmission in short-range optical connections and can be implemented at relatively low cost.

Referring to FIGS. 3 and 6, a receiver convex lens 332 with a downwardly convex shape is integrally formed on a bottom surface of the receiver body 320 facing the photodiode 310. The receiver convex lens 322 plays the same role as the receiver condenser lens 33 in an optical system according to a prior art, and focuses the parallel light reflected by the receiver reflection curved surface 310 into the photodiode 310. According to an embodiment of the present disclosure, the receiver convex lens 322 may be configured to form an integral component by processing a portion of the receiver body 320.

Referring to FIGS. 3 and 6, a receiver reflection curved surface 324 is formed on an upper portion of the receiver body 320 where the light emitted from the optical fiber 100 arrives. The receiver reflective curved surface 324 simultaneously performs both functions of reflection and conversion into light beams traveling in parallel one another. Unlike the receiver reflection prism 32 of the conventional optical system, the receiver reflection curved surface 324 has a curved surface rather than a flat surface for reflection. The angle of total reflection at each point of the receiver reflection curved surface 324 is adjusted to change the incident light into light beams traveling in parallel one another. That is, the receiver reflective curved surface 324 simultaneously performs both functions of a collimator lens 31 and a receiver reflective prism 33 in the conventional optical systems of FIGS. 1 and 2.

According to an embodiment of the present disclosure, the receiver reflective curved surface 324 may be formed within an angle range of 47.5-50° with respect to the horizontal bottom surface of the receiver body 320.

According to an embodiment of the present disclosure, the focal plane of the receiver reflection curved surface 324 may be formed on the receiver vertical surface 326 that is one side of the receiver body 320. Therefore, optical alignments on the receiver side can be easily performed by attaching the optical fiber 100 to the receiver vertical surface 326. As a result, the space between the receiver vertical surface 326 and the receiver reflection curved surface 324 corresponds to the receiver spacer 34 in the conventional optical system of FIG. 2.

According to one embodiment of the present disclosure, the optical fiber 100 may be coupled vertically to the receiver vertical surface 326. For example, the assembly 400 for an optical receiver may include an optical fiber guide 418 formed such that the optical fiber 100 is vertically coupled to the receiver vertical surface 326. According to another embodiment of the present disclosure, the optical fiber 100 may be disposed to be inclined at an angle (hereinafter referred to as a tilt angle) with respect to the vertical direction of the receiver vertical surface 326. For example, the optical fiber 100 may be disposed at a tilt angle of 5-10° with respect to the vertical direction of the receiver vertical surface 326.

In order to convert the incident light emitted from the optical fiber 100 into parallel light using the receiver reflection curved surface 324, the total reflection condition for reflecting the incident light from the optical fiber 100 into light beams in parallel one another toward the photodiode 310 must be satisfied at all portions of the receiver reflection curved surface 334. Referring to FIG. 3, the angle formed by the incident light emitted from the optical fiber 100 and the parallel light beams reflected by the receiver reflection curved surface 324 becomes smaller toward the portion close to the optical fiber 100. As a result, the incident angle on the receiver reflection curved surface 314 decreases so that it becomes more difficult to satisfy the total reflection condition. In order to satisfy the total reflection condition for a smaller angle of incidence, the receiver body 320 should be made up of materials with a high refractive index, which in turn means that manufacturing costs increase.

According to another embodiment of the present disclosure, when the optical fiber 100 is disposed to be inclined at an angle with respect to the vertical direction of the receiver vertical surface 326 as shown in FIG. 3 or 6, the angle formed by the light emitted from the optical fiber 100 and the parallel light beams reflected by the receiver reflection curved surface 324 becomes larger. As a result, the incident angle on the receiver reflection curved surface 324 increases, so that the total reflection condition is easily satisfied. Therefore, it is possible to manufacture the receiver body 320 satisfying the total reflection condition using an inexpensive material (dielectric) having a rather low refractive index, thereby reducing manufacturing cost.

According to one embodiment of the present disclosure, the optical receiver 300 is in an optically symmetrical relationship with the optical transmitter 200. Therefore, when the condition of the total reflection critical angle is satisfied on the transmission side for a refractive index of the dielectric transmitter body 220 and a tilt angle of the optical fiber 100, the same is true on the receiving side for the same conditions. As a result, it is the same as those in Table 1 whether the condition of the total reflection critical angle can be satisfied according to the tilt angle of the optical fiber 100 and the refractive index of the receiver body 320. When the optical fiber 100 is tilted at an angle, preferably in the range of 5-10°, the total reflection condition can be sufficiently satisfied even with a dielectric having a relatively low refractive index.

As noted above, since the optical receiver 300 according to the present disclosure includes the integrated receiver body 320. Therefore, the structure of the optical receiver 300 can be simplified, optical loss due to Fresnel reflection can be prevented, and noise due to backpropagation of light can be blocked. Further, the number of optical components is small and optical alignments between them can be easy.

[Assembly for Optical Transmission and Reception]

Figure 7:
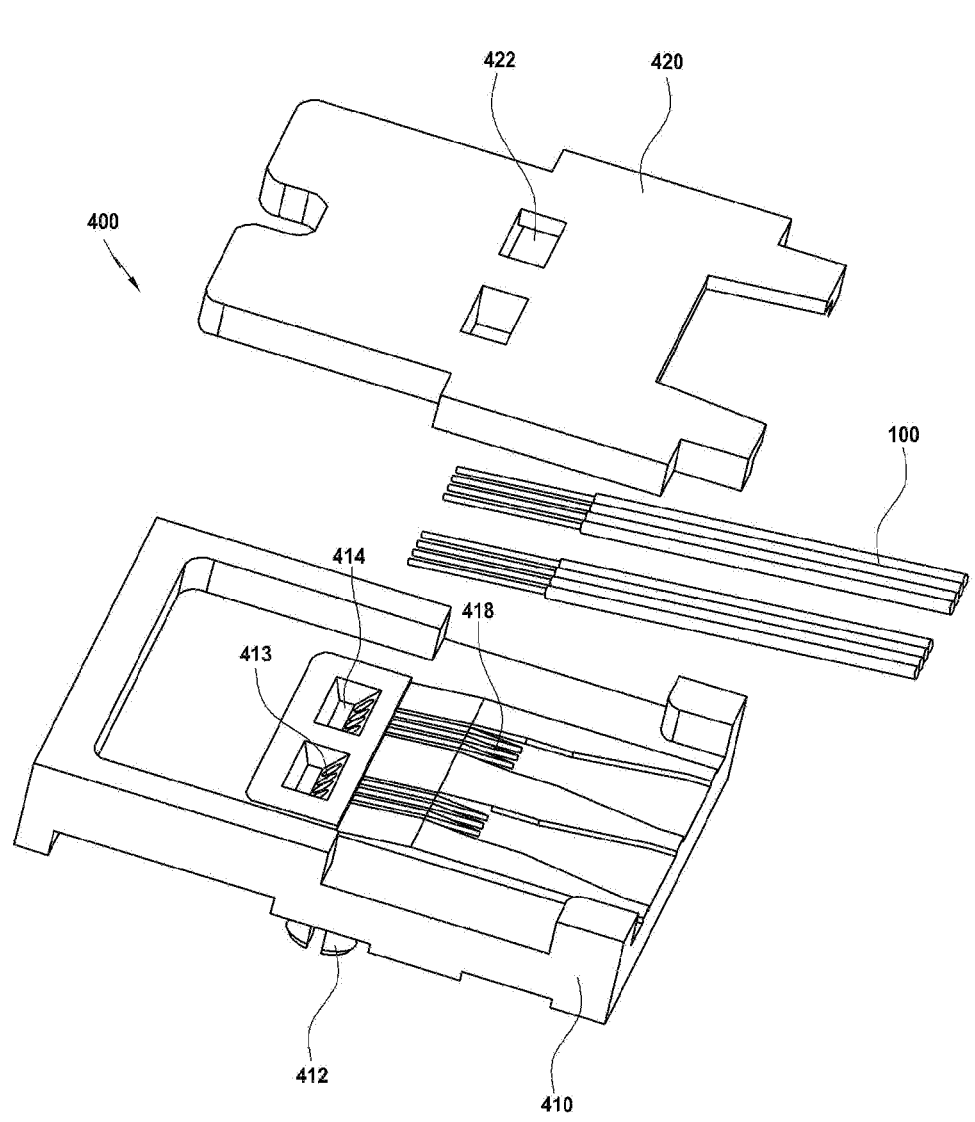
FIG. 7 shows an assembly of an optical transceiver including an optical transceiver according to an embodiment of the present disclosure.
Figure 8:
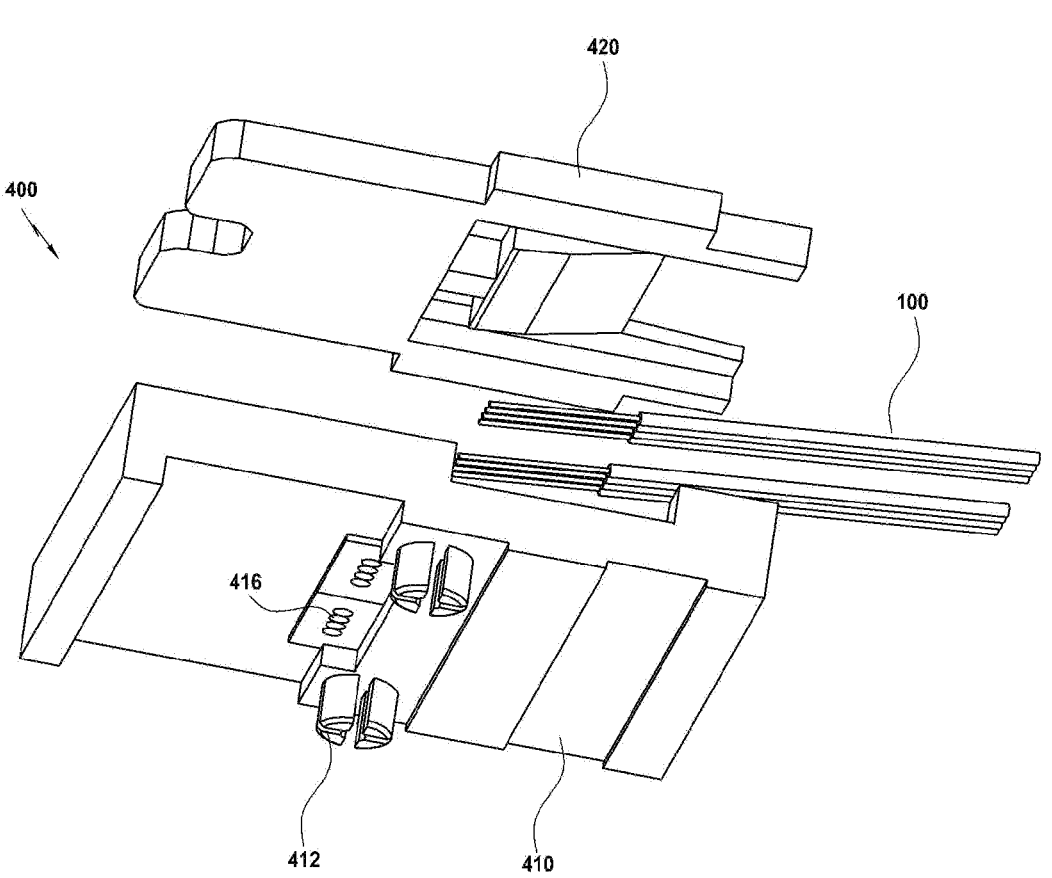
FIG. 8 shows an assembly of an optical transceiver including an optical transceiver according to an embodiment of the present disclosure.

According to an embodiment of the present disclosure, an optical transceiver may be implemented as an assembly 400 as illustrated in FIGS. 7 and 8.

An optical transmitter/receiver assembly 400 in accordance with an embodiment of the present disclosure includes a body assembly 410 and a cover assembly 420. The body assembly 410 is assembled to a substrate (not shown) on which the light sources 210 or photodiodes 310 are mounted. At least two coupling holes (not shown) is formed in the substrate, and at least two main posts 412 are formed on the body assembly 420. By coupling the main posts 412 with the coupling holes in the substrate, stable and efficient optical alignment between the at least one light source 210 or at least one the photodiode 310 and the body assembly 410 can be achieved.

According to an embodiment of the present disclosure, a first lens group 416 may be integrally formed on the lower surface of the body assembly 410, facing the light source 210 or the photodiode 310 on the substrate. A plurality of lenses are arranged in a row in the first lens group 426, which correspond to the transmitter convex lens 222 or the receiver convex lens 322.

According to an embodiment of the present disclosure, a groove 414 is formed in a predetermined region of the body assembly 410, where the transmitter reflective curved surface 224 or the receiver reflective curved surface 324 can be formed. A first lens group 416 is formed below the transmitter/receiver reflective curved surfaces 224, 324 to transmit optical signals to the photodiode 310 or receive optical signals from the light source 210 on the substrate.

According to one embodiment of the present disclosure, at least one optical fiber guide 418 is formed in the body assembly 410, which is capable of seating the optical fiber 100. The optical fiber guide 418 may be fabricated in the form of a groove capable of seating the optical fibers, as shown in FIG. 7.

In accordance with one embodiment of the present disclosure, the optical fiber guide 418 extends to the transmitter/receiver vertical surface 226, 326. So, when the optical fiber 100 is seat on the fiber guide 418, one end of the optical fiber 100 can be in contact with the transmitter/receiver vertical surface 226, 326. Since the transmitter/receiver vertical surface 226, 326 is formed at positions corresponding to the focal length or optical path length of the transmitter/receiver reflective curved surfaces 224, 324, the optical fiber 100 can be optically coupled in a stable manner to the transmitter/receiver reflective curve surfaces 224, 324 by means of seating the optical fibers in the optical fiber guide 418.

According to an embodiment of the present disclosure, the fiber guide 418 may be formed horizontally such that one end of the optical fiber 100 is vertically coupled to the transmitter/receiver vertical surface 226, 326. According to another embodiment of the present disclosure, the fiber guide 418 may be angled such that the optical fiber 100 has a predetermined tilt angle relative to the vertical direction of the transmitter/receiver vertical surface 226, 326. For example, the optical fiber guide 418 may be formed to have an inclination of 5-10° with respect to the horizontal direction.

The cover assembly 420 according to an embodiment of the present disclosure may be assembled by fitting the body assembly 410 and each assembly groove into each other. The cover assembly 420 may be combined with the body assembly 410 to prevent the optical fibers 100 and the optical systems of the optical transmitter/receiver 200, 300 from being damaged or contaminated from the outside, and serve to fix the position of the optical fibers 100. According to one embodiment of the present disclosure, the underside of the cover assembly 420 may press and secure the optical fiber 100 with the optical fiber guide 418. According to another embodiment of the disclosure, the underside of the cover assembly 420 may be formed with a fiber guide (not shown) upon which fiber 100 may rest.

The cover assembly 420 according to an embodiment of the present disclosure may include at least one or more injection holes 422 capable of injecting an epoxy or refractive index matching material. Epoxy or the like injected through the injection hole 422 can stabilize the coupling of the optical fiber 100 and the optical transmitter/receiver assembly 400, block contamination that can occur on the cross-section of the at least one optical fiber, and minimize the refractive index difference between the end-section and the transmitter/receiver vertical surface portions 226, 326 to reduce Fresnel reflection loss. Using this procedure, the optical transmitter/receiver assembly 400 according to an embodiment of the present disclosure may maximize the efficiency of optical coupling. According to another embodiment of the present disclosure, in addition to the epoxy, it is possible to inject another highly viscous material which links the optical fiber and the plastic molded part and enables optical communication. For example, an effect of reducing the NA of light incident on the optical fiber by injecting the refractive index matching oil in place of or in addition to the epoxy can be achieved.

The cover assembly 410 according to an embodiment of the present disclosure is not provided with a separate optical system, so that only the optical alignment between the substrate (not shown) and the body assembly 410 is required, and also optical alignment with respect to the optical fiber 100 can be easily performed by the operation of seating the optical fibers 100 on the fiber guide 418.

The above description is merely illustrative of the technical spirit of the present embodiment, and various modifications and changes may be made by those skilled in the art without departing from the essential characteristics of the embodiment. Therefore, the present embodiments are intended to explain rather than limit the technical spirit of the present embodiment, and the scope of the technical spirit of the present embodiment is not limited by these embodiments. The protection scope of the present embodiments should be interpreted by the claims below, and all technical spirit within the scope equivalents thereto should be interpreted as being included in the scope of the present embodiments.

The invention claimed is:

1. An optical transmitter including a transmitter body (220), wherein the transmitter body (220) comprises
   a transmitter convex lens (222) formed in a downwardly convex shape on a lower surface of the transmitter body (220), facing a light source (210) and collimating incident light emitted from the light source (210); and
   a transmitter reflective curved surface (224) formed as a reflective curved surface on one surface of the transmitter body (220), reflecting parallel rays collimated by the transmitter convex lens (222) to focus light beams reflected from the curved reflective surface into an optical fiber (100),
   wherein the transmitter convex lens (222) and the transmitter reflective curved surface (224) are integrally formed in the transmitter body (220) using a material having the same refractive index,
   wherein a cross section of the optical fiber (100) is attached to a transmitter vertical surface (226) of the transmitter body (220) and the optical fiber (100) is arranged to be inclined with a tilting angle with respect to a vertical direction of the transmitter vertical surface (226), and
   wherein the tilting angle is in a range of 5° or more and 10° or less.

2. The optical transmitter according to claim 1, wherein the reflective curved surface for the transmitter reflective curved surface (224) is formed within an angle range of 47.5° to 50° with respect to a bottom horizontal plane of the transmitter body (220).

3. The optical transmitter according to claim 1, wherein the transmitter vertical surface (226) is separated from the transmitter reflective curved surface (224) by its focal length.

4. The optical transmitter according to claim 1, further comprising an optical fiber guide (418) capable of guiding the optical fiber (100) to a position for optical alignment.

5. An assembly for an optical transmitter comprising the optical transmitter according to claim 1.

6. An optical receiver comprising a receiver body (320), wherein the receiver body (320) comprises
   a receiver reflective curved surface (324) formed as a curved reflective surface on one surface of the receiver body (320), reflecting light emitted from an optical fiber (100) to collimate incident light into parallel rays;
   a receiver convex lens (322) formed in a downwardly convex shape on a lower surface of the receiver body (320), facing a photodiode (310) and focusing parallel rays reflected from the receiver reflective curved surface (324) to the photodiode (310), wherein the receiver reflective curved surface (324) and the receiver convex lens (322) are integrally formed in the receiver body (320) using a material having the same refractive index, and wherein a cross section of the optical fiber (100) is attached to a receiver vertical surface (326) of the receiver body (320) and the optical fiber (100) is arranged to be inclined with a tilting angle with respect to a vertical direction of the receiver vertical surface (326), wherein the tilting angle is in the range of 5° or more and 10° or less.

7. The optical receiver according to claim 6, wherein the reflective curved surface for the receiver reflective curved surface (324) is formed within an angle range of 47.5° to 50° with respect to a horizontal bottom surface of the receiver body (320).

8. The optical receiver according to claim 6, wherein the receiver vertical surface (326) is separated from the receiver reflective curved surface (324) by its focal length.

9. The optical receiver according to claim 6, further comprising an optical fiber guide (418) capable of guiding the optical fiber (100) to a position for optical alignment.

10. An assembly for an optical receiver comprising the optical receiver according to claim 6.

\* \* \* \* \*